(12) United States Patent
Livens et al.

(10) Patent No.: US 10,565,789 B2
(45) Date of Patent: Feb. 18, 2020

(54) METHOD AND SYSTEM FOR GEOMETRIC REFERENCING OF MULTI-SPECTRAL DATA

(71) Applicant: VITO NV, Mol (BE)

(72) Inventors: Stefan Livens, Mol (BE); Bavo Delaure, Mol (BE)

(73) Assignee: VITO NV, Mol (BE)

( * ) Notice: Subject to any disclaimer, the term of this patent is extended or adjusted under 35 U.S.C. 154(b) by 36 days.

(21) Appl. No.: 16/067,841

(22) PCT Filed: Jan. 13, 2017

(86) PCT No.: PCT/EP2017/050717
§ 371 (c)(1),
(2) Date: Jul. 3, 2018

(87) PCT Pub. No.: WO2017/121876
PCT Pub. Date: Jul. 20, 2017

(65) Prior Publication Data
US 2019/0340811 A1    Nov. 7, 2019

(30) Foreign Application Priority Data

Jan. 13, 2016  (EP) .................................... 16151160

(51) Int. Cl.
*G06T 17/00* (2006.01)
*G06T 3/40* (2006.01)
(Continued)

(52) U.S. Cl.
CPC ............ *G06T 17/10* (2013.01); *G01C 11/025* (2013.01); *G01J 3/2823* (2013.01); *G06T 3/4038* (2013.01);
(Continued)

(58) Field of Classification Search
CPC ... G06T 17/10; G06T 3/4038; G06T 2200/04; H04N 5/332; G01J 3/2823; G01J 2003/2826; G01C 11/025
See application file for complete search history.

(56) References Cited

U.S. PATENT DOCUMENTS

| | | | | |
|---|---|---|---|---|
| 2005/0089213 A1* | 4/2005 | Geng | ................ | G06K 9/00214 |
| | | | | 382/154 |
| 2012/0257047 A1* | 10/2012 | Biesemans | ........... | G06K 9/0063 |
| | | | | 348/135 |

(Continued)

FOREIGN PATENT DOCUMENTS

| WO | 2004027348 A2 | 4/2004 |
|---|---|---|
| WO | 2011073430 A1 | 6/2011 |

(Continued)

OTHER PUBLICATIONS

International Search Report and Written Opinion in PCT/EP2017/050717, dated May 12, 2017.

(Continued)

*Primary Examiner* — Ming Y Hon
(74) *Attorney, Agent, or Firm* — Bacon & Thomas, PLLC

(57) ABSTRACT

A method for geometric referencing of multi-spectral data in a sequence of images, the images containing distinct regions representing imaged radiation in respective distinct wavelengths. The method includes selecting a subset from the sequence of images, the subset containing a plurality of images, each image of which represents a field of view that overlaps with a field of view of at least one other image in the same subset; generating a 3D model by performing photogrammetric 3D reconstruction on the images in the subset; estimating a displacement and a yaw between pairs of successive images of the sequence of images; and using the 3D model and the estimated displacement and yaw to calculate photogrammetric parameters for images of the (Continued)

sequence of images that are not in the selected subset. Additionally, a corresponding system and a corresponding computer program product.

9 Claims, 5 Drawing Sheets

(51) Int. Cl.
  *G01J 3/28* (2006.01)
  *G06T 17/10* (2006.01)
  *H04N 5/33* (2006.01)
  *G01C 11/02* (2006.01)
(52) U.S. Cl.
  CPC ...... *H04N 5/332* (2013.01); *G01J 2003/2826* (2013.01); *G06T 2200/04* (2013.01)

(56) References Cited

U.S. PATENT DOCUMENTS

| | | | | |
|---|---|---|---|---|
| 2013/0027554 | A1* | 1/2013 | Meadow | 348/144 |
| 2014/0300686 | A1* | 10/2014 | Campbell | H04N 5/23238 348/36 |
| 2019/0102913 | A1* | 4/2019 | Madison | G06T 9/00 |

FOREIGN PATENT DOCUMENTS

| | | |
|---|---|---|
| WO | 2012168904 A2 | 12/2012 |
| WO | 2014031284 A1 | 2/2014 |
| WO | 2014151746 A2 | 9/2014 |
| WO | 2016005411 A1 | 1/2016 |
| WO | 2016005412 A1 | 1/2016 |

OTHER PUBLICATIONS

Li Lichun et al., A New Navigation Approach of Terrain Contour Matching Based on 3-D Terrain Reconstruction from Onboard Image Sequence, Science China Technological Sciences, vol. 53, No. 5, pp. 1176-1183, May 2010.
T. Reize et al., Relative Pose Estimation from Airborne Image Sequences, ISPRS Ann. Photogramm, Remote Sens. Spatial Inf. Sci., 1-3, Abstract, Jul. 19, 2012.
Alsadik et al., "Optimal Camera Network Design for 3D Modeling of Cultural Heritage," ISPRS Annals of the Photogrammetry, Remote Sensing and Spatial Information Sciencs, I-3, 7-12 (2012).
Aleksandra A. Sima et al., "Semi-Automated Registration of Close-Range Hyperspectral Scans Using Oriented Digital Camera Imagery and a 3D Model," The Photogrammetric Record 29(145): Mar. 10-29, 2014, 20 pages.
Darren Turner et al., "Direct Georeferencing of Ultrahigh-Resolution UAV Imagery," IEEE Transactions on Geoscience and Remote Sensing, vol. 52, No. 5, May 2014, pp. 2738-2745.

* cited by examiner

80% overlap

Flight direction band i+1
band i

Image$_i$    Image$_{i+1}$ ground object

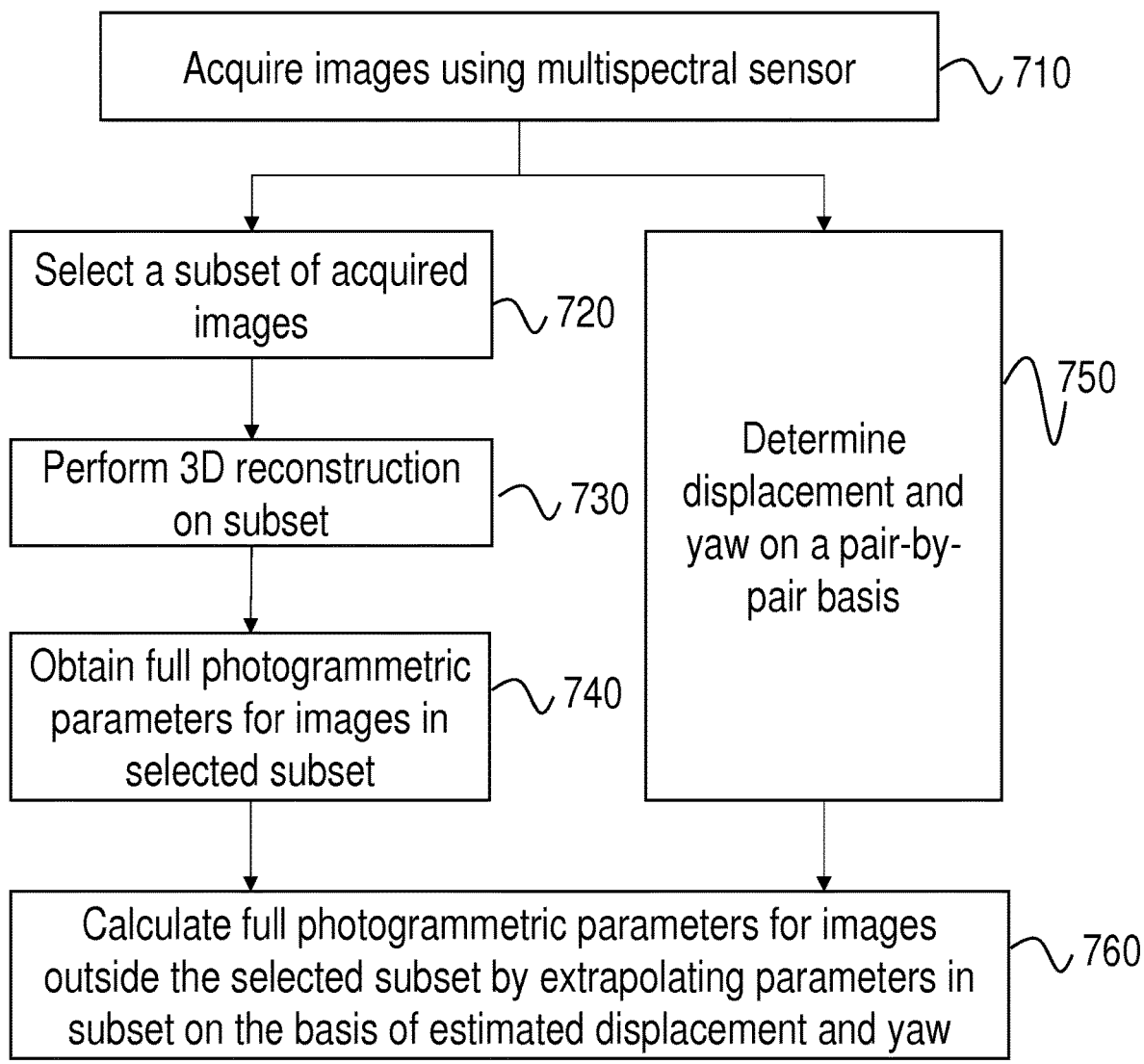

METHOD AND SYSTEM FOR GEOMETRIC REFERENCING OF MULTI-SPECTRAL DATA

The invention relates to the field of image capturing e.g. in aerial imaging. More particularly, the present invention relates to sensing systems for obtaining multi-spectral images, corresponding imaging systems and methods for using them.

BACKGROUND OF THE INVENTION

Hyperspectral imaging is a form of spectral imaging wherein information from across the electromagnetic spectrum is collected in many narrow spectral bands and processed. From the different spectral images that are collected, information of the objects that are imaged can be derived. For example, as certain objects leave unique spectral signatures in images which may even depend on the status of the object, information obtained by multi-spectral imaging can provide information regarding the presence and/or status of objects in a region that is imaged. After selection of a spectral range that will be imaged, as spectral images in this complete spectral range can be acquired, one does not need to have detailed prior knowledge of the objects, and post-processing may allow to obtain all available information. Whereas originally hyperspectral remote sensing was mainly used for mining and geology, other applications such as ecology, agriculture and surveillance also make use of the imaging technique.

It is known to use photogrammetric techniques to infer three-dimensional information, in particular elevation information, from the acquired two-dimensional images. An example of such a technique is disclosed in Alsadik, B. S., Gerke, M., & Vosselman, G. (2012), "Optimal Camera Network Design For 3D Modeling Of Cultural Heritage", *ISPRS Annals of the Photogrammetry, Remote Sensing and Spatial Information Sciences*, I-3, 7-12.

Some agricultural and ecological applications are known wherein hyperspectral remote sensing is used, e.g. for monitoring the development and health of crops, grape variety detection, monitoring individual forest canopies, detection of the chemical composition of plants as well as early detection of disease outbreaks, monitoring of impact of pollution and other environmental factors, etc. are some of the agricultural applications of interest. Hyperspectral imaging also is used for studies of inland and coastal waters for detecting biophysical properties. In mineralogy, detection of valuable minerals such as gold or diamonds can be performed using hyperspectral sensing, but also detection of oil and gas leakage from pipelines and natural wells are envisaged. Detection of soil composition on earth or even at other planets, asteroids or comets also are possible applications of hyperspectral imaging. In surveillance, hyperspectral imaging can for example be performed for detection of living creatures.

International patent application publication WO 2011/073430 A1, in the name of the present applicant, discloses a sensing device for obtaining geometric referenced multi-spectral image data of a region of interest in relative movement with respect to the sensing device. The sensing device comprises a first two dimensional sensor element and a spectral filter. The spectral filter and the first sensor element are arranged for obtaining spectral information at a first wavelength or wavelength range using a part of the first sensor element and for obtaining spectral information at a second wavelength or wavelength range using another part of the first sensor element. As a result of this arrangement, different parts of a single image acquired with the first sensor will represent the imaged scenery as seen is radiation of a different respective wavelength.

To date, there is no satisfactory way to apply the aforementioned photogrammetric techniques directly to multi-spectral or hyperspectral images such as those acquired by means of the first sensor of WO 2011/073430 A1. Nevertheless, full photogrammetric information about the acquired multi-spectral or hyperspectral images is essential to correctly stitch together an image of the scanned scenery in any particular wavelength band.

In WO 2011/073430 A1, this problem is solved by providing a second sensor on the same substrate, which simultaneously acquires panchromatic images of the area imaged by the first sensor. The panchromatic images are used to perform 3D modeling, and the 3D model information is subsequently transposed to the composite images of the scenery in the different wavelength bands that are covered by the multi-spectral or hyperspectral first sensor.

Unpublished international patent application no. PCT/EP2015/065523, in the name of the present applicant, describes a sensing device for obtaining geometric referenced multi-spectral image data of a region of interest in relative movement with respect to the sensing device, the sensing device comprising: at least a first two-dimensional sensor element, the sensing device being adapted for obtaining subsequent multi-spectral images during said relative motion of the region of interest with respect to the sensing device thus providing distinct spectral information for different parts of a region of interest using the first sensor element; a second two-dimensional sensor element, the sensing device being adapted for providing, using the second sensor element, an image of the region of interest for generating geometric referencing information to be coupled to the distinct spectral information; the first two-dimensional sensor element being operable to capture a first sequence of frames at a first frame rate and the second two-dimensional sensor element being operable to capture a second sequence of frames at a second frame rate; wherein the first frame rate is higher than the second frame rate; and wherein the sensing device further comprises a processor configured to generate intermediate geometric referencing information to be coupled to frames of said first sequence of frames for which no synchronous frame from said second sequence of frames is available, said intermediate geometric referencing information being derived from one or more temporally similar frames from said second sequence of frames. In this way, the system of PCT/EP2015/065523 is able to reduce the number of panchromatic images required to perform geometric referencing, relative to the system of WO 2011/073430 A1, by means of interpolation or extrapolation. However, the system of PCT/EP2015/065523 does not change the assumption that panchromatic images remain necessary.

The article by inventor of the present invention A. Sima et al., "Semi-Automated Registration of Close-Range Hyperspectral Scans Using Oriented Digital Camera Imagery And A 3D Model", *The Photogrammetric Record*, vo. 29 (2104), no. 145, discloses a semi-automated method for registering terrestrial panoramic hyperspectral imagery with LIDAR models and conventional digital photography. The method relies on finding corresponding points between images acquired in significantly different parts of the electromagnetic spectrum, from different viewpoints, and with different spatial resolution and geometric projections. The article recognizes that the number of homologous points that can be matched between a hyperspectral band and a covering (panchromatic) digital camera image varies with the wavelength, and proposes a technique that relies on a judicial selection of spectral bands in which a maximum number of points can be matched.

Unpublished international patent application no. PCT/EP2015/065524, in the name of the present applicant, describes a method for performing photogrammetric 3D reconstruction of objects imaged in a sequence of images, the images containing distinct regions representing imaged radiation in respective distinct wavelengths, the method comprising: selecting a plurality of subsets from the sequence of images, each one of the plurality of subset containing a plurality of images, each image of which represents a field of view that overlaps with a field of view of at least one other image in the same subset; generating a set of intermediate 3D models by performing photogrammetric 3D reconstruction on the images in respective ones of the subsets; and recombining the intermediate 3D models from the set of 3D models into a combined 3D model. However, this method still requires a significant amount of processing.

International patent application publication no. WO 2014/151746 A2 in the name of URC Ventures Inc. discloses techniques for analyzing images acquired via mobile devices in various ways, including to estimate measurements for one or more attributes of one or more objects in the images. For example, the described techniques are stated to be usable to measure the volume of a stockpile of material or other large object, based on images acquired via a mobile device that is carried by a human user as he or she passes around some or all of the object. During the acquisition of a series of digital images of an object of interest, various types of user feedback may be provided to a human user operator of the mobile device, and particular images may be selected for further analysis in various manners. Furthermore, the calculation of object volume and/or other determined object information may include generating and manipulating a computer model or other representation of the object from selected images. The techniques disclosed in this article are not concerned with images that represent radiation in distinct wavelengths.

The article by Lichun Li et al., "A new navigation approach of terrain contour matching based on 3-D terrain reconstruction from onboard image sequence", *Science China Technological Sciences*, vol. 35 (2010), no. 5, 1176-1183, discloses a passive navigation method of terrain contour matching by reconstructing the 3-D terrain from the image sequence acquired by an onboard camera. To achieve automation and simultaneity of the image sequence processing for navigation, a correspondence registration method based on control points tracking is proposed which tracks the sparse control points through the whole image sequence and uses them as correspondence in the relation geometry solution. A key frame selection method based on the images overlapping ratio and intersecting angles is explored, and then the requirement for the camera system configuration is provided. The proposed method also includes an optimal local homography estimating algorithm according to the control points, which helps correctly predict points to be matched and their corresponding speed. Consequently, the real-time 3-D terrain of the trajectory thus reconstructed is matched with the referenced terrain map, and the result provides navigating information. The techniques disclosed in this article are not concerned with images that represent radiation in distinct wavelengths.

The article by Turner Darren et al., "Direct Georeferencing of Ultrahigh-Resolution UAV Imagery", *IEEE Transactions on Geoscience and Remote Sensing*, vol. 52 (2014), no. 5, 2738-2745, discloses a concept for a camera-global positioning system (GPS) module that allows the synchronization of camera exposure with an airframe's position as recorded by a GPS with 10-20-cm accuracy. Lever arm corrections were applied to the camera positions to account for the positional difference between the GPS antenna and the camera center. Image selection algorithms were implemented to eliminate blurry images and images with excessive overlap. This study compared three different software methods (Photoscan, Pix4D web service, and an in-house Bundler method), evaluating each based on processing time, ease of use, and the spatial accuracy of the final mosaic produced. The article mentions the need to remove some of these overlapping images to improve processing efficiency, which is achieved by reading the image location information from image EXIF headers. An image overlap of around 80% is stated to yield the best results for SfM-based image processing algorithms. Image subsetting is achieved by computing the distance between consecutive images. The techniques disclosed in this article are not concerned with images that represent radiation in distinct wavelengths.

International patent application publication no. WO 2014/031284 A1 in the name of Visual Intelligence LP, discloses an imaging sensor system comprising: a mount unit affixed to a vehicle or a platform and having at least three imaging sensors disposed within the mount unit, wherein a first, second and third imaging sensor each has a focal axis passing through an aperture in the mount unit, wherein the first image sensor generates a first image area of the target area comprising a first array of pixels, wherein the second image sensor generates a second image area of the target area comprising a first array of pixels, wherein the first and second imaging sensors are offset to have a first image overlap area in the target area, wherein the first sensors image data bisects the second sensors image data in the first image overlap area. Various embodiments are described. The camera array assembly is configured such that adjoining borders of the relevant image areas overlap slightly. While this document suggests ortho-rectifying the sequence of overlapping images using standard photogrammetry techniques to produce an orthomap in which each pixel has an unique latitude and longitude coordinate and a unique elevation coordinate, it does not address dealing with images acquired in different spectral ranges.

International patent application publication no. WO 2004/027348 A2, in the name of M7 Visual Intelligence LP, discloses a method to calibrate an on-board remote sensing system using a self-locking travel pattern and target remote sensing data. The self-locking travel pattern includes a number of parallel travel lines having overlapping swath widths between adjacent travel lines. The overlapping swath widths are used to determine the boresight angles and range offset of the remote sensor device. In addition, the method can be used to generate estimated horizontal and vertical displacement errors. These estimated errors can be used as correction factors for the range offset and boresight angles.

There is a need for an alternative way of geometrically referencing multi-spectral or hyperspectral images that does not rely on simultaneously acquired panchromatic images and that has limited computational complexity.

SUMMARY OF THE INVENTION

According to an aspect of the present invention, there is provided a method for geometric referencing of multi-spectral data in a sequence of images, the images containing distinct regions representing imaged radiation in respective distinct wavelengths, the method comprising: selecting a subset from the sequence of images, said subset containing a plurality of images, each image of which represents a field of view that overlaps with a field of view of at least one other image in the same subset; generating a 3D model by performing photogrammetric 3D reconstruction on the images in the subset; estimating a displacement and a yaw between pairs of successive images of said sequence of images; and using said 3D model and said estimated displacement and yaw to calculate photogrammetric parameters for images of said sequence of images that are not in said selected subset.

Throughout the present application, the term "multispectral" is understood to include "hyperspectral", unless indicated otherwise.

It is an advantage of the present invention that accurate geometric referencing of a set of piece-wise multispectral images can be made more efficient by judiciously combining photogrammetric techniques—for images that are sufficiently spaced apart—with interpolation techniques—for all images in between the images that are selected for photogrammetry.

Like the invention described in unpublished patent application no. PCT/EP2015/065524, the present invention is inter alia based on the surprising insight of the inventors that 3D modeling can successfully be applied to multi-spectral images despite the difference in appearance of the same features in different images, provided that the images used for the 3D reconstructions are sufficiently far apart. Thus, when choosing pairs of images for photogrammetric 3D modeling, the conflicting demands of spectral proximity (the closer the imaging wavelengths are, the more visually similar the images will be) and spatial separation (the further apart the images were taken, the more pronounced the depth information will be) yields a surprising "sweet spot" where efficient and accurate photogrammetric processing of pairs of multi-spectral or hyperspectral images turns out to be possible. However, the present invention mitigates the excessive processing requirements of the photogrammetric technique of PCT/EP2015/065524 by restricting its application to a subset of images, and resolving the parameters for the intervening images by means of interpolation.

In an embodiment, the method according to the present invention further comprises obtaining the sequence of images by means of a hyperspectral sensor having a sensing element with different parts that are sensitive to different wavelengths.

The inventors have found that the present invention is particularly well suited to resolve the referencing issues occurring in hyperspectral images.

In an embodiment of the method according to the present invention, the sequence of images comprises images closely spaced in a direction of motion of a sensor so as to have an overlap in said direction of approximately 99%.

The improvement in computational complexity obtained by using the present invention is particularly significant when the images to be processed are extremely closely spaced, as is the case for hyperspectral images obtained in aerial spectral photography campaigns.

According to an aspect of the present invention, there is provided a computer program product comprising code means configured to cause a processor to perform, when executed, the steps of the method as described above.

According to an aspect of the present invention, there is provided a system for geometric referencing of multi-spectral data in a sequence of images, the images containing distinct regions representing imaged radiation in respective distinct wavelengths, the system comprising a processor configured to: select a subset from the sequence of images, said subset containing a plurality of images, each image of which represents a field of view that overlaps with a field of view of at least one other image in the same subset; generate a 3D model by performing photogrammetric 3D reconstruction on the images in the subset; estimate a displacement and a yaw between pairs of successive images of said sequence of images; and use said 3D model and said estimated displacement and yaw to calculate photogrammetric parameters for images of said sequence of images that are not in said selected subset.

In an embodiment of the system according to the present invention, the images are hyperspectral images, obtained by a hyperspectral sensor having a sensing element with different parts that are sensitive to different wavelengths.

In an embodiment of the system according to the present invention, the sequence of images comprises images closely spaced in a direction of motion of a sensor so as to have an overlap in said direction of approximately 99%.

The technical effects and advantages of embodiments of the computer program product and the system according to the present invention correspond mutatis mutandis to those of embodiments of the method according to the present invention.

BRIEF DESCRIPTION OF THE DRAWINGS

These and other technical aspects and advantages of embodiments of the present invention will now be described in more detail with reference to the accompanying drawings, in which:

FIG. 7 provides a flow chart representing an embodiment of the method according to the present invention.

DETAILED DESCRIPTION OF THE INVENTION

"3D reconstruction", as used in the present description, is the process of capturing the shape (and appearance) of real objects.

"Photogrammetric 3D reconstruction", as used in the present description, also called "structure from motion" or "image-based modelling", is the process of capturing the shape (and appearance) of real objects using imagery. Photogrammetric 3D reconstruction of an object requires a minimum of 2 images of that object, acquired from different viewpoints; in many practical circumstances, when the camera calibration is not sufficiently precise, 3 images will be required. The coordinates of pixels in the image sequence corresponding to one ground location (object point) are used to derive simultaneously (bundle adjustment): interior image orientation parameters, exterior image orientation parameters, and 3D coordinates of the ground point (object point). The accuracy of the 3D reconstruction results depends (among others) on the image network (e.g. forward and side overlap).

To perform photogrammetry in optimal circumstances, the set of images would have to have a sufficient degree of detail (e.g., at least 500-1000 pixels in each direction), and an appropriate form factor (preferably a similar size in X and Y direction, as very elongated form factors tend to reduce the accuracy).

Preferably, the successive images used for photogrammetry have an overlap of about 80%. If the amount of overlap is substantially less, the area common to the two images is smaller, yielding fewer common features. If the amount of overlap is substantially more, the angular displacement between the images becomes very small, resulting in less accurate estimates.

Figure 1:
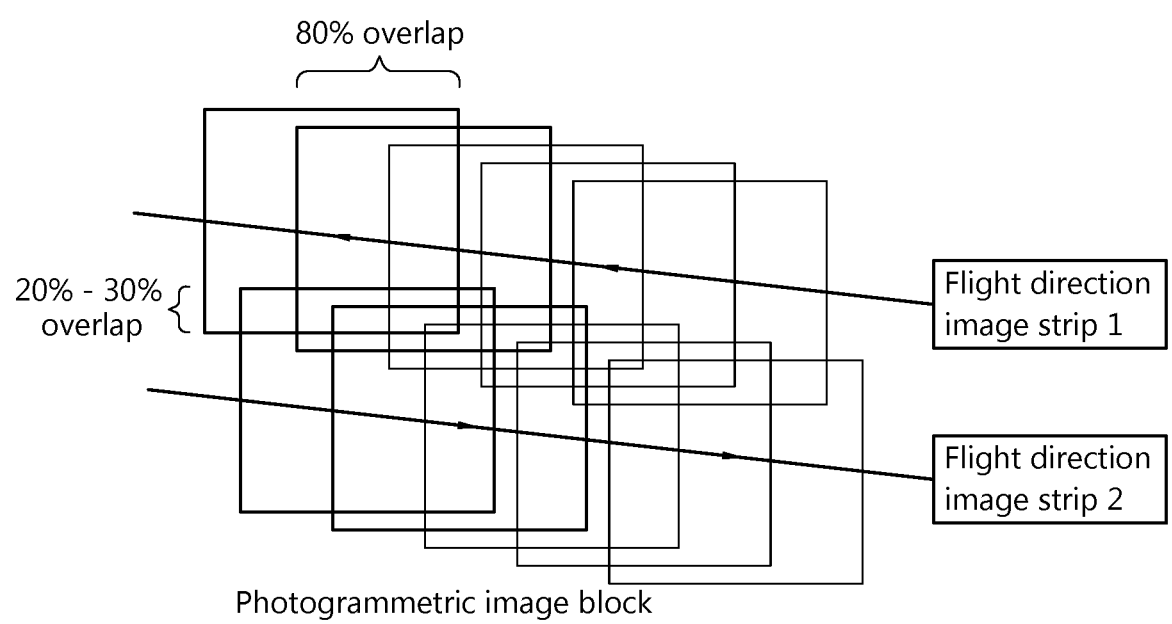
FIG. 1 schematically illustrates the flying path taken by an exemplary aerial vehicle used to acquire images of the earth, and the boundaries of consecutive images acquired by a sensor aboard such vehicle.

FIG. 1 (not to scale) schematically illustrates the flying path taken by an exemplary aerial vehicle used to acquire images of the earth, and the boundaries of consecutive images acquired by a sensor aboard such vehicle, shown as a two-dimensional map (plan view). The sequence of images thus acquired will hereinafter also be referred to as an "image network". The sensor may be active in the visual range (e.g., an RGB sensor), or in another specific spectral region (e.g. near infrared, short-wave infrared, etc.).

As the acquired images are two-dimensional, multiple images are needed to allow three-dimensional reconstruction of the imaged terrain. In particular, three-dimensional reconstruction of individual features requires these features to be present in several images taken from different angles, which implies that subsequent images acquired by the sensor must display sufficient overlap, as explained above. As illustrated in FIG. 1, a typical value of the amount of overlap between consecutive images taken in a given flying direction is in the order of 80%. The sideways overlap between images acquired during a first pass and a second pass of adjacent respective strips of terrain, whereby the first pass and the second pass typically correspond to different flying directions, is in the order of 20-30%.

Figure 2:
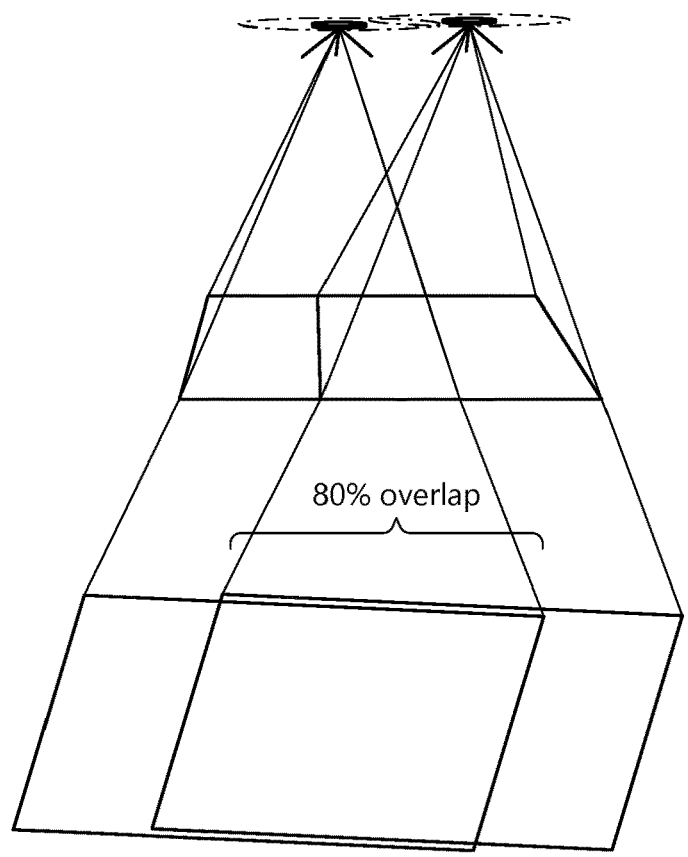
FIG. 2 provides a perspective view of the region imaged by two consecutive acquisitions in the map of FIG. 1.

FIG. 2 provides a perspective view of the region imaged by two consecutive acquisitions in the map of FIG. 1, indicating in particular the area of overlap between the imaged areas.

Figure 3:
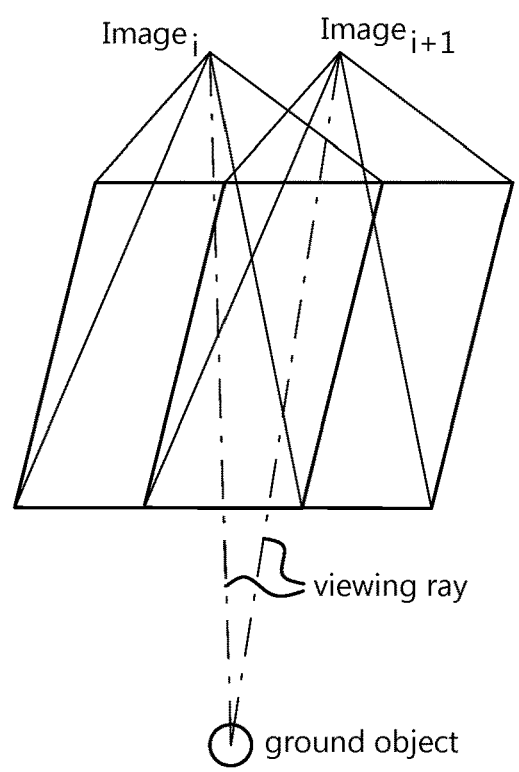
FIG. 3 schematically represents the angle of view of the sensor of FIGS. 1 and 2 for consecutive imaging positions.

FIG. 3 schematically represents the angle of view of the sensor of FIGS. 1 and 2 for consecutive imaging positions, and illustrates how the viewing ray from the sensor to any given ground object changes significantly from one image ($image_i$) to the next ($image_{i+1}$). This difference in viewing angle is what allows the photogrammetric reconstruction of 3D characteristics of the feature, in particular its elevation.

Figure 4:
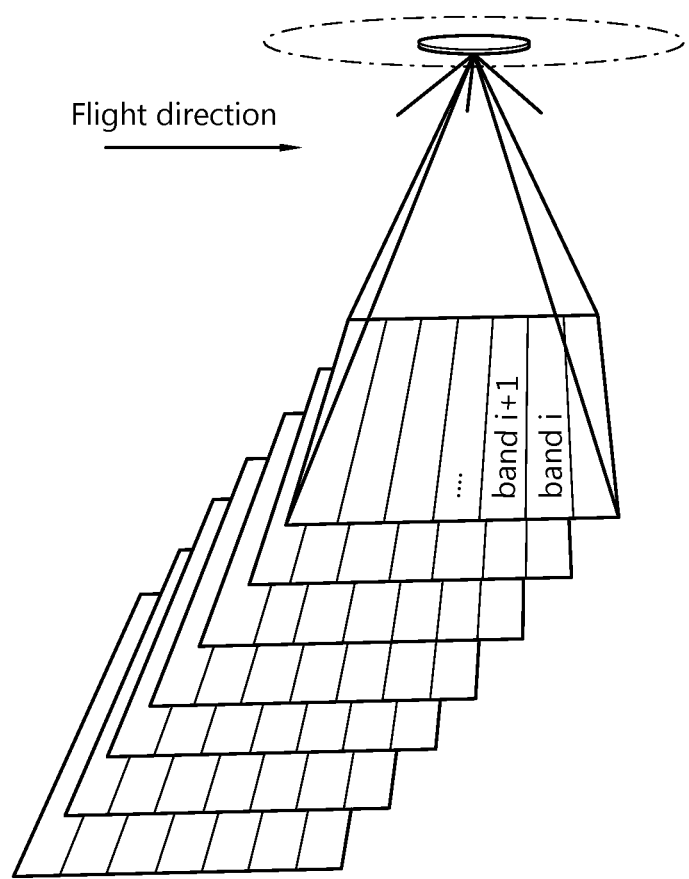
FIG. 4 provides a perspective view of the region imaged by consecutive acquisitions of a multi-spectral sensor, in particular a hyperspectral sensor.

FIG. 4 provides a perspective view of the region imaged by consecutive acquisitions of a multi-spectral sensor, in particular a hyperspectral sensor. An example of a hyperspectral sensor is disclosed in international patent application publication WO 2011/073430 A1, in the name of the present applicant, where it is described as the "first sensor", operating in conjunction with a second (visual-range) sensor. While the "first sensor" of WO 2011/073430 A1 shall be referred to in order to clarify the present invention, it must be understood that the present invention is not limited thereto.

It is typical of such hyperspectral sensors that different parts of the sensing element are sensitive to different wavelengths. This effect may be obtained by providing a sensing element with a filtering layer that has a wavelength response that varies across the surface of the sensing element. Accordingly, each image taken by such a hyperspectral sensor is in fact a mosaic in which different parts of the image represent the corresponding part of the terrain as seen in radiation of different respective wavelength bands. In order to obtain an image of any given area as seen in radiation of one specific wavelength band, the relevant parts of a large number of such mosaics must be pieced together. It is clear that these hyperspectral sensors require closely spaced images, e.g. 99% in the forward direction (which, depending on the speed of the sensor movement, may require a very high frame rate) to ensure full spatial coverage in all the relevant bands of the spectrum.

Thus, considering individual images, the image lines are divided over the various spectral bands in the forward direction. As a result, in each individual image, an individual spectral band is only covered with a small number of lines (e.g., this number can be less than 10 for hyperspectral imaging with more than 100 spectral bands). This situation prohibits the use of photogrammetry on these individual bands.

Figure 5:
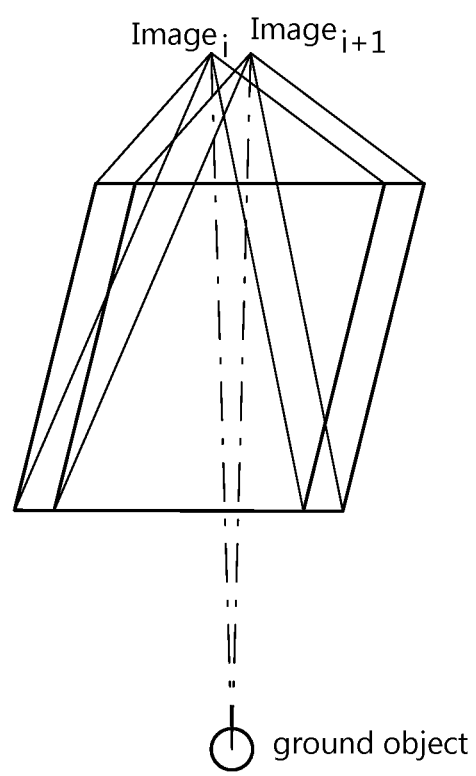
FIG. 5 schematically represents the angle of view of the sensor of FIG. 4 for consecutive imaging positions.

FIG. 5 schematically represents the angle of view of the sensor of FIG. 4 for consecutive imaging positions, and illustrates how the viewing ray from the sensor to any given ground object changes from one image ($image_i$) to the next ($image_{i+1}$). As a result of the high frame rate of these hyperspectral sensors, the difference in viewing angle, which is needed for photogrammetric reconstruction of 3D characteristics of ground features, becomes very small. This negatively impacts the accuracy (in terms of vertical position estimation, exterior image orientation, interior image orientation, etc.) that can be achieved with such images by applying photogrammetry. Moreover, methods for dealing with small parallax image sets tend to be so demanding from a computational point of view, that it is not feasible in practice for large data sets.

The present invention is based inter alia on the inventive insight of the inventors that despite the conflicting demands of spectral proximity and spatial separation, efficient and accurate photogrammetric processing of selected sets of multi-spectral or hyperspectral images turns out to be possible. The present invention is also based on the further insight of the inventors that the remaining images, in-between the images selected for photogrammetric processing, can be more efficiently processed on the basis of a relatively simple estimation of displacement and yaw (z-axis rotation), whereupon the photogrammetric parameters obtained for the selected images can be interpolated to the remaining images.

Figure 6:
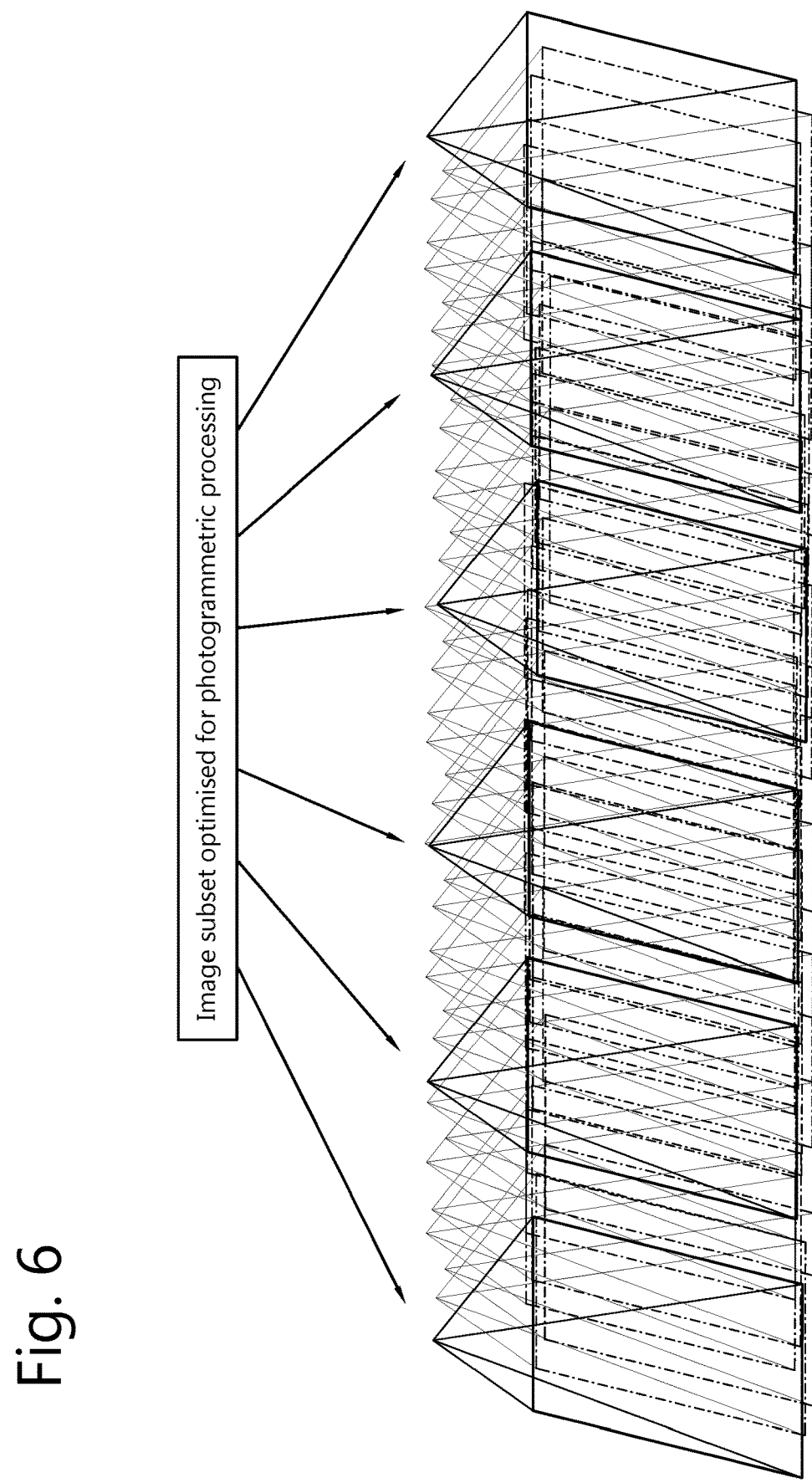
FIG. 6 schematically illustrates the principle of the present invention.

FIG. 6 schematically illustrates the concept of selecting a subset out of the sequence of images. For the purpose of the present invention, a subset is selected out of the sequence of images, in which pairs of images have at least the minimally required overlap to allow photogrammetric processing, while presenting a sufficiently large parallax (e.g., an overlap in the forward direction of 80%).

FIG. 7 is a flow chart of an embodiment of the method according to the present invention. The method operates on a series of images, acquired 710 by means of a multi-spectral sensor.

A subset of the acquired images is selected 720, in accordance with the above mentioned criteria of sufficient overlap and parallax. 3D reconstruction is performed 730 on the images of this subset, allowing the calculation of full photogrammetric parameters for the selected images 740; i.e., for each of the selected images, the available parameters will include (x, y, z)-coordinates as well as the pitch, roll, and yaw angles of the sensor.

The remaining images undergo a processing, consisting of estimating relative displacement and z-axis rotation from one image to the next 750. Given a multi-spectral sensor with gradually varying wavelength sensitivities, most features will appear very similar from one image to the next, as they are represented in wavelength bands that are not far apart. Hence, this processing is much less complex than a full photogrammetric processing with a very small parallax. On the basis of the estimates of relative displacement and z-axis rotation, the full set of photogrammetric parameters for each of the remaining images can be derived by interpolation, using the parameters of the photogrammetrically processed subset as known boundary values.

Interpolation may be performed using mathematical techniques as known in the art.

The present invention also pertains to a system for geometric referencing of multi-spectral data in a sequence of images, the images containing distinct regions representing imaged radiation in respective distinct wavelengths, the system comprising a processor configured to: select a subset from the sequence of images, said subset containing a plurality of images, each image of which represents a field of view that overlaps with a field of view of at least one other image in the same subset; generate a 3D model by performing photogrammetric 3D reconstruction on the images in the subset; estimate a displacement and a yaw between pairs of successive images of said sequence of images; and use said 3D model and said estimated displacement and yaw to calculate photogrammetric parameters for images of said sequence of images that are not in said selected subset.

The "processor" as referred to hereinabove may be implemented as one or more dedicated hardware components (e.g., ASICs), configurable hardware components (e.g., FGPAs), programmable components with appropriate software (e.g., general-purpose processors or DSPs), or any combination thereof. The same component or components may also perform other functions.

The system may further comprise suitable interfaces to access the sequence of images containing the multi-spectral data, and to output the generated geometric referencing information. The term "interfaces" designates the necessary hardware and software to allow the processor to exchange data with a data source or recipient. Preferably, the interfaces operate according to a standardized protocol stack, such as a standard for storage area networks (SAN), local area networks (LAN; e.g. the IEEE 802.3 "Ethernet" standard), or personal area networks (PAN; e.g. USB).

At the network and transport layer, the interfaces may operate according to the TCP/IP protocol family, allowing inter alia for a deployment in which the images are acquired over the internet and/or the results of the method are supplied to their destination over the internet.

The present invention also pertains to a computer program product comprising code means configured to cause a processor to carry out the steps of the method according to the present invention.

While the invention has been described herein with reference to specific embodiments, this has been done to clarify and not to limit the invention, the scope of which is to be determined by reference to the enclosed claims.

The invention claimed is:

1. A method for geometric referencing of multi-spectral data in a sequence of images, the images containing distinct regions representing imaged radiation in respective distinct wavelengths, the method comprising:
    selecting a subset from the sequence of images, said subset containing a plurality of images, each image of which represents a field of view that overlaps with a field of view of at least one other image in the same subset;
    generating a 3D model by performing photogrammetric 3D reconstruction on the images in the subset;
    estimating a displacement and a yaw between pairs of successive images of said sequence of images; and
    using said 3D model and said estimated displacement and yaw to calculate photogrammetric parameters for images of said sequence of images that are not in said selected subset.

2. The method according to claim 1, further comprising obtaining said sequence of images by means of a hyperspectral sensor having a sensing element with different parts that are sensitive to different wavelengths.

3. The method according to claim 2, wherein said sequence of images comprises images closely spaced in a direction of motion of a sensor so as to have an overlap in said direction of approximately 99%.

4. The method according to claim 1, wherein said sequence of images comprises images closely spaced in a direction of motion of a sensor so as to have an overlap in said direction of approximately 99%.

5. A computer program product comprising code means configured to cause a processor to perform, when executed, the steps of the method according to claim 1.

6. A system for geometric referencing of multi-spectral data in a sequence of images, the images containing distinct regions representing imaged radiation in respective distinct wavelengths, the system comprising a processor configured to:
    select a subset from the sequence of images, said subset containing a plurality of images, each image of which represents a field of view that overlaps with a field of view of at least one other image in the same subset;
    generate a 3D model by performing photogrammetric 3D reconstruction on the images in the subset;
    estimate a displacement and a yaw between pairs of successive images of said sequence of images; and
    use said 3D model and said estimated displacement and yaw to calculate photogrammetric parameters for images of said sequence of images that are not in said selected subset.

7. The system according to claim 6, wherein said images are hyperspectral images, obtained by a hyperspectral sensor having a sensing element with different parts that are sensitive to different wavelengths.

8. The system according to claim 7, wherein said sequence of images comprises images closely spaced in a direction of motion of a sensor so as to have an overlap in said direction of approximately 99%.

9. The system according to claim 6, wherein said sequence of images comprises images closely spaced in a direction of motion of a sensor so as to have an overlap in said direction of approximately 99%.

* * * * *

UNITED STATES PATENT AND TRADEMARK OFFICE
CERTIFICATE OF CORRECTION

PATENT NO. : 10,565,789 B2
APPLICATION NO. : 16/067841
DATED : February 18, 2020
INVENTOR(S) : Stefan Livens et al.

Page 1 of 1

It is certified that error appears in the above-identified patent and that said Letters Patent is hereby corrected as shown below:

On the Title Page

Item (72), under the listing of inventors, please add Dirk Maria L. NUYTS, Mol (BE)

Signed and Sealed this
Twelfth Day of May, 2020

Andrei Iancu
*Director of the United States Patent and Trademark Office*